O. C. KNIPE.
BAKING MACHINERY.
APPLICATION FILED MAY 29, 1912.
1,064,345.
Patented June 10, 1913.
2 SHEETS—SHEET 1.
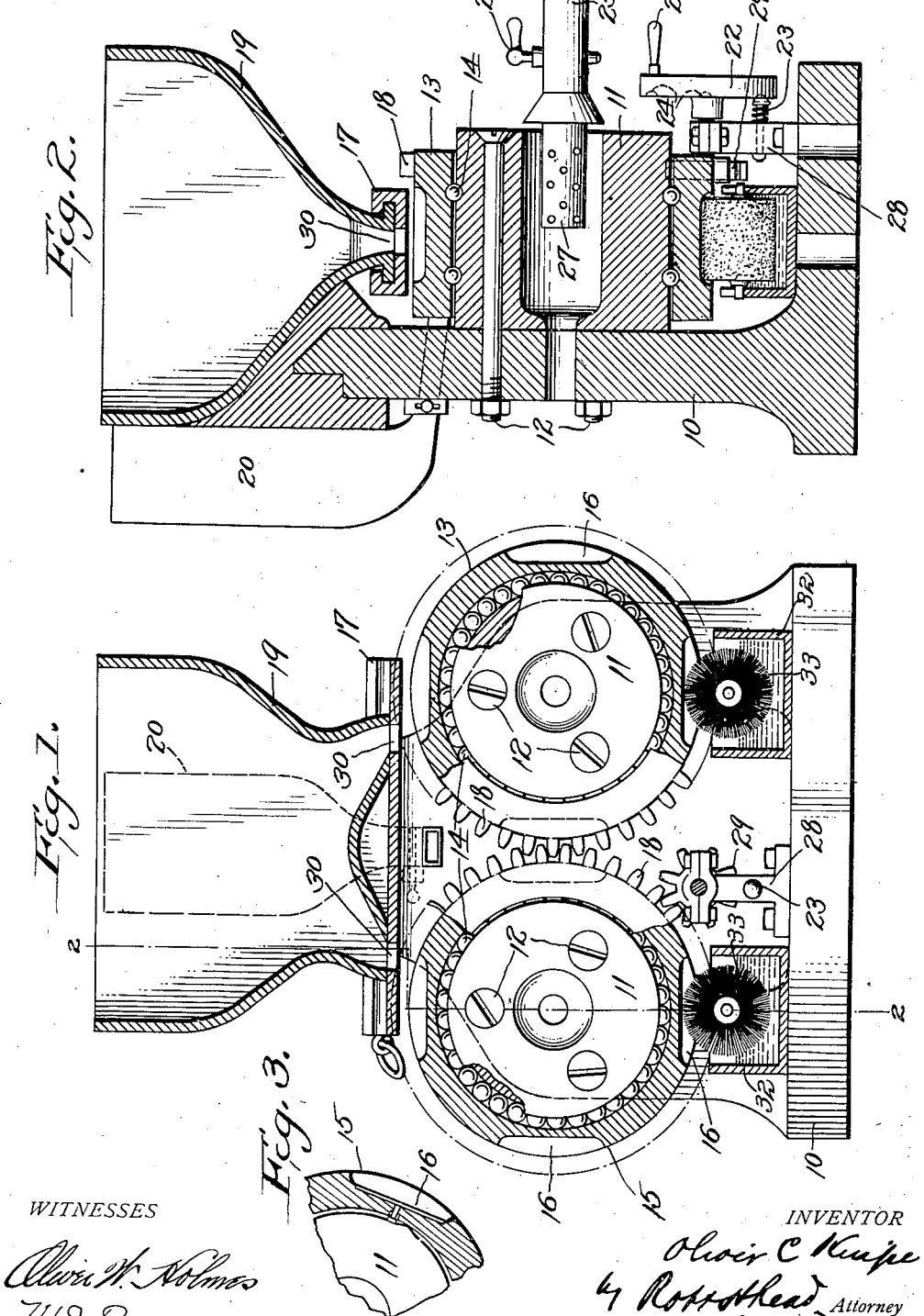
WITNESSES
INVENTOR
Oliver C. Knipe
by Ross Head, Attorney

O. C. KNIPE.
BAKING MACHINERY.
APPLICATION FILED MAY 29, 1912.

1,064,345.

Patented June 10, 1913.
2 SHEETS—SHEET 2.

WITNESSES
Oliver W. Holmes
M. J. Bunnell

INVENTOR
Oliver C. Knipe
by Rob. Ahead Attorney

UNITED STATES PATENT OFFICE.

OLIVER C. KNIPE, OF PALO ALTO, CALIFORNIA.

BAKING MACHINERY.

1,064,345.    Specification of Letters Patent.    Patented June 10, 1913.

Application filed May 29, 1912. Serial No. 700,539.

*To all whom it may concern:*

Be it known that I, OLIVER C. KNIPE, a citizen of the United States, and resident of Palo Alto, in the county of Santa Clara and State of California, (whose post-office address is No. 526 Columbia road, Washington, District of Columbia,) have invented new and useful Improvements in Baking Machinery, of which the following is a specification.

This invention relates to machines for baking cakes and pastry and is especially adapted for thin paste or batter preparations such as are used for griddle cakes and waffles, and answers admirably for all materials that can be fed from a reservoir or hopper and deposited on heated moving surfaces (preferably grooved rolls heated and caused to revolve while the batter is being deposited from the reservoir). The baking of strips of dough delivered from a die or previously rolled pastry such as that for pie crusts and crackers can be economically performed on the same machine.

The object of the invention is to produce a device simple in construction, low in cost, light in weight, and adapted for family, restaurant and factory use.

The features claimed as new are the supply of strips of dough or portions of batter simultaneously to moving surfaces (preferably heated revolving rolls) to partially bake them, and uniting the strips or portions for final baking, and also the insertion of sweetening material or confection (if so desired) between the strips at or before the time of uniting them for the completion of the baking; other features are fully brought forth in the specification and drawings.

Figure 4:
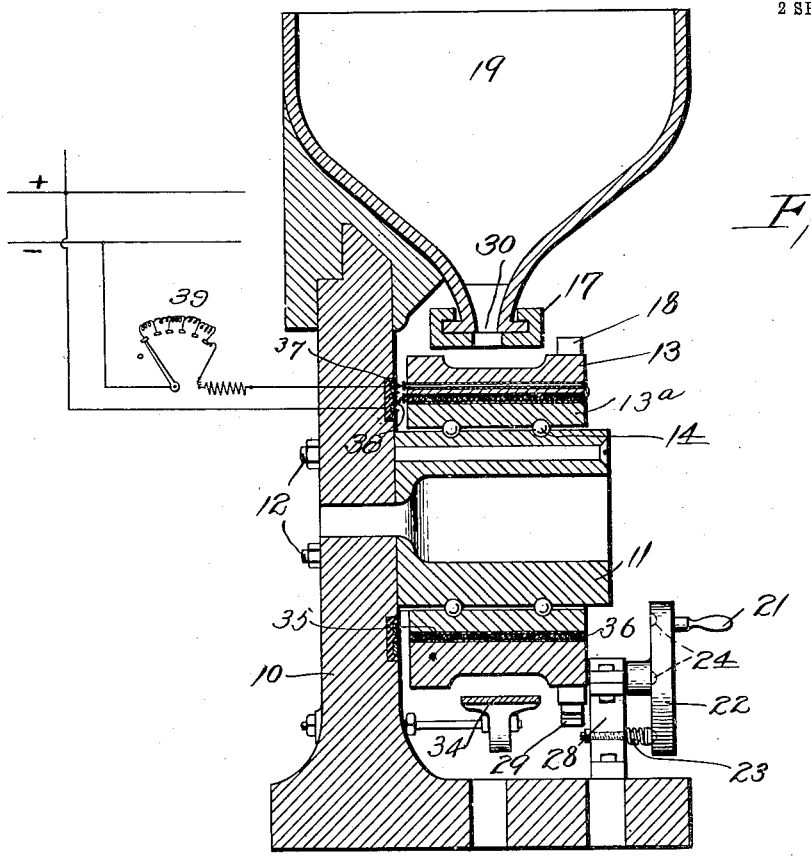
Figure 5:
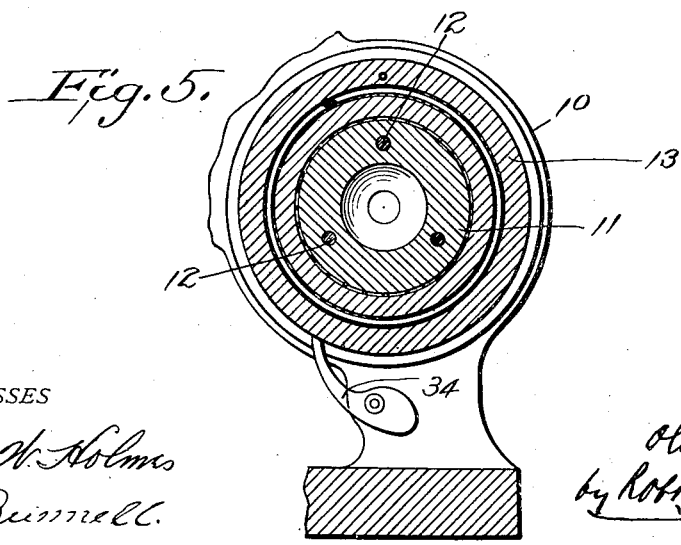

In the accompanying sheets of drawings: Figure 1 is a sectional side elevation of the machine;—Fig. 2 is a sectional end view through the line "2" Fig. 1;—Fig. 3 is a sectional detail of one of the depressions or baking pans;—Fig. 4 is a sectional view similar to Fig. 2, but showing a modified form of heating device;—Fig. 5 is a sectional side elevation of a portion of Fig. 4.

Referring to the figures, 10 is the main frame piece on which is mounted hollow skids, 11, preferably secured to the frame by bolts, 12, two annular rotatable molds with flanged rims, 13, are mounted on the skids, 11. The molds are geared to each other as indicated, in such manner that when spur wheel, 29, mounted in a journaled support 28, and in mesh with the teeth of 18, is turned by the crank 21, the molds revolve toward one another. The rims or revolving molds 13, are retained in place and given anti-friction support by placing balls 14 in concentric grooves formed in 11, and 13, as indicated in the drawings.

In the end of each hollow cylinder 11, is inserted a gas or other hydro-carbon burner 27, the latter being secured to the frame 10, in any suitable manner to support it in position. Fuel is received for the burners through the pipes 25, furnished with cutoff valves 26.

Supported from the main frame 10, of the machine and directly above the rolls is hopper 19, provided with openings 30, to discharge the batter or paste to the respective rolls. A cutoff slide 17, regulates the discharge. Attached to the hopper is a vessel or reservoir 20, provided with a spout see Figs. 1 and 2, to feed confection to the portions of batter or pastry, and provided with a cutoff valve, if desired.

Beneath each roll is a pan 32, for supplying grease to the roller 33, which in turn contacts with the baking roll or mold 13. On the under side of each mold 13 is pivoted to the main frame a knife 34, see Fig. 5, the sharp edge resting at an acute angle on the baking surface of the roll. In the modified form of baking surface arranged to bake the material in separated portions and not in continuous strips the depressions may be arranged with false or loose bottoms 16, to assist in removing the baked cakes from the molds.

As indicated in the drawings when baking in the mold 13, provided with depressions 15, the rotation may be arrested at intervals by the spring catches 23, engaging the depressions 24 in the rim of wheel 22, to which the handle 21, is attached to arrest motion and cause a dwell of the moving heated surfaces which may be overcome after the dough is set or baking completed by a stronger effort of the operator. It will be seen that the mold can be stopped when a depression is in a horizontal position under the spout of the reservoir, a given quantity of batter deposited, and the valve closed without continuing the rotation until the batter shall have had an opportunity to set or partially bake in a horizontal position: the rolls can then be rotated 90° and the two portions can be allowed to dwell in that position until the baking is completed.

The source of heat may be gas as indicated in Figs. 1, and 2, or electricity as in Figs. 4, and 5. When electricity is employed each roll 13 is formed of two concentric members 13, 13ª the inner member being covered with mica or other insulating material 35, a coil of resistance wire 36 wrapped on it and another cover of insulating material placed over the wire 37, the member 13ª is then slid on current is led to and from the heating coils by copper brushes 37, 38—which bear against rings of copper mounted on the standard and separated therefrom by mica or other heat resistant insulation and these rings are connected with a source of electric supply through an adjustable rheostat 39 as indicated.

The operation of the machine is as follows: The hopper being full of batter, and the rolls heated sufficiently, the cutoff 17 is moved to the position shown in Fig. 1, to open the spouts and the crank 21 is turned, revolving the rolls slowly toward each other. The batter striking the hot roll immediately begins to cook, and as the rolls revolve, is carried in a thin sheet on each roll to the point where the rolls are nearest together. At this point the uncooked surface of the batter upon each roll reaches the corresponding batter on the other, and the two flow together, the final cooking or baking then taking place at the place where the rolls are nearest together. The completed pastry is discharged immediately below and may be delivered in any suitable or approved manner.

As the rolls revolve the adhering burnt particles of batter are scraped from the rolls by the knives 34, see Fig. 5, or by the spring actuated false bottoms 16 of the mold pans 15, where that type is used, and the rolls are kept well greased by the brush 33, revolving in the pans 32.

When it is desired to insert confection between the two portions of the cake the cutoff valve is opened in the reservoir 20 just as the two parts are being united for final baking and the filling or confection introduced through a spout between the two layers. When baking continuous strips the valve remains constantly open.

While I have described the best form of my invention now known to me, I desire to have it understood that my invention may be made to take many forms by a skilled mechanic without departing from the spirit thereof, and parts thereof may be used independently of others, and all of these I desire to cover being limited only by the claims annexed hereto.

Having thus described my invention, what I claim as new and desire to secure by Letters Patent is:

1. A baking machine comprising a pair of heated surfaces, means for supplying uncooked pastry to each, said surfaces being adapted to approach one another to unite the partially cooked pastry into a unitary product, and to recede after the cooking.

2. In a baking machine, the combination of two heated surfaces arranged to approach each other, means for supplying batter to each, heaters for partially baking the same, and means for feeding a confection between the partially cooked layers, said layers uniting to form a composite pastry product.

3. In a baking machine, a pair of rotatable rolls, means for heating the same, whereby they may be raised to a baking temperature as they rotate, and means for supplying batter to each roll at a point in advance of their nearest approach to permit the two portions of batter to unite into a unitary product.

4. In a machine of the character described, a pair of rotatable rolls parallel and spaced a short distance apart, means for maintaining the rolls hot, and means for supplying batter to the rolls through a plurality of discharge openings for supplying batter to the respective rolls, the space between the rolls being such that the layers of partially baked batter merge and unite into a unitary product.

5. A baking machine comprising a pair of heated surfaces, means for supplying uncooked pastry to each, said surfaces being adapted to approach one another to unite the partially cooked pastry into a unitary product, and to recede after the cooking, and means for discharging the cooked pastry.

6. A baking machine comprising a pair of heated surfaces mounted to approach and recede from each other, a source of supply for uncooked pastry adjacent to the point of close approach, means for shifting the surfaces and causing a dwell after filling with pastry whereby the two layers are caused to unite.

7. A baking machine comprising a pair of surfaces mounted a short distance apart at their nearest point of approach, an electric heater carried by each surface, and means for supplying uncooked pastry near the point of closest approach, whereby the two portions of pastry merge into a unitary product.

OLIVER C. KNIPE.

Witnesses:
  M. J. BUNNELL,
  CHARLES LOWELL HOWARD.